(12) United States Patent
Rajagopal et al.

(10) Patent No.: US 6,535,640 B1
(45) Date of Patent: Mar. 18, 2003

(54) SIGNAL ANALYSIS SYSTEM AND METHOD FOR DETERMINING A CLOSEST VECTOR FROM A VECTOR COLLECTION TO AN INPUT SIGNAL

(75) Inventors: Ram Rajagopal, Austin, TX (US); Lothar Wenzel, Round Rock, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/560,695

(22) Filed: Apr. 27, 2000

(51) Int. Cl.[7] .............................. G06K 9/62; G06K 9/46
(52) U.S. Cl. ....................................... 382/225; 382/253
(58) Field of Search .................................. 382/225, 219, 382/220, 251, 253, 218, 118; 704/256, 222

(56) References Cited

U.S. PATENT DOCUMENTS

| | | | | |
|---|---|---|---|---|
| 5,748,839 A | * | 5/1998 | Serizawa ..................... | 704/222 |
| 5,933,806 A | * | 8/1999 | Beyerlein et al. ........... | 704/256 |
| 6,104,835 A | * | 8/2000 | Han ............................ | 382/225 |
| 6,128,410 A | * | 10/2000 | Park et al. .................. | 382/218 |
| 6,321,193 B1 | * | 11/2001 | Nystrom et al. ............ | 704/222 |
| 6,430,307 B1 | * | 8/2002 | Souma et al. ............... | 382/118 |

* cited by examiner

*Primary Examiner*—Jon Chang
*Assistant Examiner*—Brian Le
(74) *Attorney, Agent, or Firm*—Meyertons Hood Kivlin Kowert & Goetzel, P.C.; Jeffrey C. Hood

(57) ABSTRACT

A signal analysis system/method, for identifying the closest vector in a vector collection to a given input signal vector, comprising an input, a memory, and a processing unit. The memory stores a collection of vectors, and a table of mutual distances between pairs of the vectors in the collection. The processing unit may receive an input vector corresponding to the input signal. The processing unit may be further configured to: (a) select a vector from a current collection; (b) compute the distance of the input vector to the selected vector; (c) determine if the computed distance is smaller than a bounding radius value; (d) perform an annular filtration in response to the computed distance not being smaller than the bounding radius value, wherein the annular filtration retains in the current collection only those vectors whose tabulated distances from the selected vector are greater than the computed distance minus a radius value, and less than the computed distance plus the radius value; and to iteratively perform (a), (b), (c) and (d) until the computed distance to the selected point is smaller than the radius value, whereupon, the processor may identify the selected vector as the solution vector (i.e. the closest vector of the vector collection to the input vector), and may provide an output indication to a user in response this identification.

41 Claims, 12 Drawing Sheets

Continuation of 200

SIGNAL ANALYSIS SYSTEM AND METHOD FOR DETERMINING A CLOSEST VECTOR FROM A VECTOR COLLECTION TO AN INPUT SIGNAL

FIELD OF THE INVENTION

The present invention relates to the field of signal processing, and in particular, to an improved system and method for identifying which signal vector in a collection of signal vectors is nearest (in the sense of some norm) to a given input signal vector.

DESCRIPTION OF THE RELATED ART

Many problems in engineering and the applied sciences reduce to the problem of distance minimization, i.e. the problem of identifying which vector in a particular collection of vectors is closest to a given input vector. For example, in the field of telecommunications, a transmitter may transmit a stream of symbols from a predefined set of symbols. Each of the predefined symbols may be associated with a corresponding bit pattern. A receiver may receive the stream of symbols corrupted with noise, and may perform a distance minimization to map each of the received symbols to one of the predefined symbols.

Another fundamental problem in the field of telecommunications is the so-called delay estimation problem. A transmitter may transmit a known template signal to a receiver. A receiving device may receive a delayed and noise-perturbed version of the known template signal. The receiving device may perform a distance minimization to estimate the time-delay between the received signal (i.e. the delayed noise-perturbed version of the template signal) and the template signal. Namely, the receiving device may generate an ensemble of time-delayed versions of the template signal, and may select the particular time-delayed version of the ensemble which is closest to the received signal in the sense of some vector norm. When the norm is the Euclidean norm, this distance minimization is equivalent to traditional autocorrelation.

In general, the distance minimization problem may be stated as follows. Given a collection X of vectors (e.g. signals, sequences, codes, symbols, etc.) and an input vector, identify the particular vector in the collection X which is closest to the input vector in the sense of some vector norm. In many situations, it is possible to assume that the input vector is within a distance r from exactly one of the vectors in the collection X, where distance r is less than or equal to ½ of the minimum distance between vectors in the collection X. This assumption will be referred to herein as the bounding assumption. An analysis of the noise mechanisms which perturb input vectors away from the collection X may give rise to an estimate for distance r.

Given a collection of N vectors P(0), P(1), P(2), ..., P(N−1), and an input vector which obeys the bounding assumption with respect to the collection and a bounding radius r, one prior art method for identifying the closest vector in the collection to the input vector may be described as follows:

k=0;

MORE: compute S(k)=∥P(k)−g∥
  if (S(k)<r)
    Output k as closest vector index;
    Return;
  else
    k=k+1
    goto MORE
  endif wherein ∥.∥ denotes a given vector norm. In other words, this prior art algorithm prescribes sequentially searching through the collection of vectors until the solution vector is identified. The solution vector is distinguished by having a distance from input vector g which is smaller than the bounding radius r. This sequential search algorithm identifies the solution vector in N/2 iterations on average, and at worst case in N iterations.

In many applications, the average convergence in N/2 iterations provided by the sequential search algorithm may be too slow, especially when N is large. Thus, there exists a need for a system and method which could more efficiently determine the signal vector from a collection of signal vectors which is closest to a given input vector.

Furthermore, the sequential search algorithm provides no mechanism for increasing the convergence rate when the bounding radius is small, i.e. when input vectors tightly cluster around vectors of the vector collection X. Thus, there exists a need for a system and method which could identify the solution vector (i.e. the vector with minimum distance to the input vector) with increased speed when the bounding radius r is small.

SUMMARY OF THE INVENTION

A signal analysis system and method according to the present invention may, at least in some embodiments, address the problems described above associated with determining the closest vector in a vector collection to a given input signal vector. The signal analysis system may comprise an input (e.g. a receiving device), a memory (e.g. one or more of RAM, ROM, non-volatile memory, etc.), and a processing unit. The memory may store a collection of vectors, and a table of mutual distances between pairs of the vectors in the collection. The memory may also store a software program for determining the closest vector in the vector collection to the input signal vector.

The input may be configured to receive an input signal from a communication medium (e.g. the Public Switched Telephone Network, an Ethernet bus, a PCI bus, the atmosphere, an optical fiber, a transducer, etc.). The input signal may comprise a sequence of samples, e.g., a sequence of samples of an analog signal.

The processing unit may be coupled to the memory, and may be configured to receive an input vector corresponding to the input signal and execute the software program for determining the closest vector. The processing unit may be further configured to execute the following methodology starting with index m=0 in order to determine the closest vector in the vector collection X(0) to the given input signal vector. The closest vector is referred to herein as the solution vector.

(1) select a vector $P(k_m)$ in the vector collection X(m);
(2) analyze the table of mutual distances to determine a filtered subset X(m+1) of the vector collection X(m), wherein the vectors of the filtered subset X(m+1) have a distance to the selected vector $P(k_m)$ which is greater than a first value $FV_m$ and smaller than a second value $SV_m$, where the first value and the second value depend on index m;
(3) set m=m+1, i.e. increment index m;
(4) repeat (1), (2) and (3) zero or more times;
(5) identify a solution vector from the filtered collection, preferably after one or more iterations of (1), (2) and (3); and (6) provide an output indication to a user in response to said identification of the solution vector.

Because of (3), the filtered subset X(m+1) becomes a new vector collection X(m) in a subsequent iteration of (1) and (2). The processing unit may repeat (1), (2) and (3) zero or more times until the selected vector $P(k_m)$ has a distance from the input signal which is less than a bounding radius value.

The processing unit may be further configured to (c) compute a distance S(m) between the selected vector $P(k_m)$ and the input vector, and (d) determine if the distance S(m) is smaller than the bounding radius value. The processing unit is configured to perform (c) and (d) after (1) and prior to (2). The processing unit may compute the first value $FV_m$ by subtracting the bounding radius value from the distance S(m), and compute the second value $SV_m$ by adding the bounding radius value to the distance S(m).

In the preferred embodiment, the memory stores a minimum distance data determination program. The processing unit may be configured to iteratively perform (1), (2), and (3) in response to execution of the minimum distance data determination program.

In a shift estimation or time-delay estimation application, the collection of vectors may represent shifted (e.g. delayed) versions of a known template signal, and input signal vector may represent a shifted and noise-perturbed version of the template signal, wherein the shift value (e.g. time-delay) is not known beforehand. The solution vector provides an estimate of the shift value. The output indication provided to the user may comprise an indication of the shift value or a data value computed in response to the shift value. For example, in a radar application, the shift value may be converted to an estimated range for a reflecting object (e.g. an aircraft), and the estimated range may be displayed on a display device (e.g. a screen, a head mounted display, a projection screen, etc.).

In a pattern recognition application, the collection of vectors may be feature pattern vectors representing various physical objects (or images), and the input signal vector may represent a sequence of features extracted from a given input object (or image), i.e. an initially unknown one of the physical objects (or images). The solution vector represents a selection of the one physical object (or image) that identifies the given input object from the set of physical objects. The output indication provided to the user may indicate the selected object (or image). For example, the output indication may comprise highlighting a visual representation of the selected object (or image) on a display screen.

In a telecommunications application, the collection of vectors represent codes (or symbols) which are assigned to corresponding bit patterns, and the input signal vector represents one of the codes perturbed by noise. In this case, the solution vector indicates which code the input signal vector "belongs to" with highest likelihood. The bit pattern corresponding to the solution code may be sent to an output buffer. A stream of input signal vectors may be thus identified with their solution codes, and the resulting bit patterns may be accumulated into a digital output stream. The digital output stream may comprise a voice stream, a video stream, a stream of measurement and/or sensor data, etc. The digital output stream may be converted into an analog signal and present to the user in audible form through a speaker as in a telephony application (e.g. a cellular phone application, an Internet telephony application, etc.), in visual form through a display device (such as a monitor, a head-mounted display), etc.

In one application, the input signal comprises a localized subset of pixel values sampled from a particular locality in a "pixilated" image (i.e. an image comprising a plurality of pixels). Furthermore, the collection of vectors comprise rotated versions of a representative subset of pixel values sampled from a template image. In this application, the solution vector indicates the orientation of the template image in the pixilated image.

BRIEF DESCRIPTION OF THE DRAWINGS

A better understanding of the present invention can be obtained when the following detailed description is considered in conjunction with the following drawings, in which.

DETAILED DESCRIPTION OF THE PREFERRED EMBODIMENT

Figure 1:
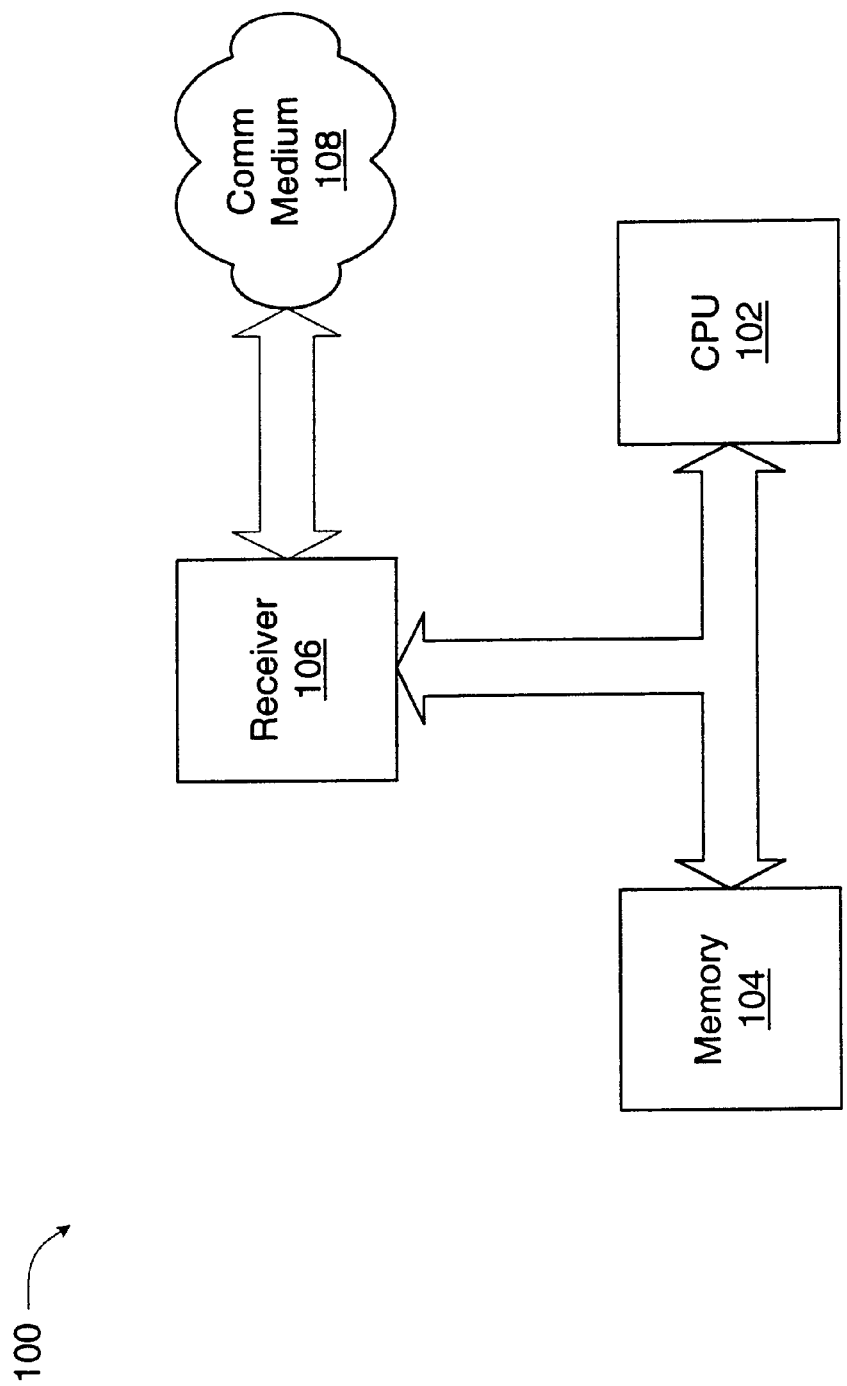
FIG. 1 illustrates one embodiment of a signal analysis system configured to identify a closest vector in a vector collection to an input signal vector.

FIG. 1 presents one embodiment for a signal analysis system 100 according to the present invention. Signal analysis system 100 may comprise a central processing unit 102, a memory medium 104 and a receiver 106. CPU 102 may be realized by any of a variety of processing technologies. For example, CPU 102 may comprise a general-purpose processor, a vector processor, a parallel processor, a digital signal processor, etc., or any combination thereof. It is noted that programmable or reconfigurable logic, e.g., a Field Programmable Gate Array (FPGA), may be used instead of or in addition to CPU 102.

Receiver 106 may represent any of a variety of receiving devices and/or sensors. For example, receiver 106 may be a radio receiver, a network interface card, a modem, a sensing device, etc. Receiver 106 may couple to a communication medium 108, and is configured to receive an input signal from the communication medium 108. Receiver 106 may be configured to operate on the input signal so as to recover a stream of digital data. For example, receiver 106 may include demodulation and analog-to-digital conversion circuitry for recovering the digital data from the input signal. Receiver 106 may store the digital data into memory 104. This digital data is also referred to herein as input signal data. In one embodiment, communication medium 108 may be a digital transmission medium (e.g. an Ethernet bus) which provides a digital signal to receiver 106. In this case, receiver 106 may not need analog-to-digital conversion circuitry.

Memory 104 may comprise any of a variety of memory devices. For example, memory 104 may include read-only memory (ROM) and/or random access memory (RAM). Memory 104 preferably includes at least one memory medium on which computer programs according to the present invention may be stored. The term "memory medium" is intended to include various types of memory or storage, including an installation medium, e.g., a CD-ROM, or floppy disks, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution.

The memory medium preferably stores a software program for determining a closest vector from a vector collection to a given input signal vector. The software program may be implemented in any of various ways, including procedure-based techniques, component-based techniques, object-oriented techniques, or neural net based learning techniques, among others. For example, the software program may be implemented using ActiveX controls, C++ objects, Java objects, Microsoft Foundation Classes (MFC), or other technologies or methodologies, as desired. A CPU, such as the CPU 102, executing code and data from the memory medium comprises a means for identifying the closest vector of the given vector collection to the given input vector according to the methods or flowcharts described below. Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In addition to the input signal data, memory 104 may store:

- a collection of vectors (or data structures) denoted P(0), P(1), P(2), ..., P(N−1);
- a table of mutual distances between pairs of vectors P(I) and P(J) of the vector collection;
- a software program executable by CPU 102 for identifying the closest vector in the vector collection to a given input vector corresponding to the input signal data.

Figure 2:
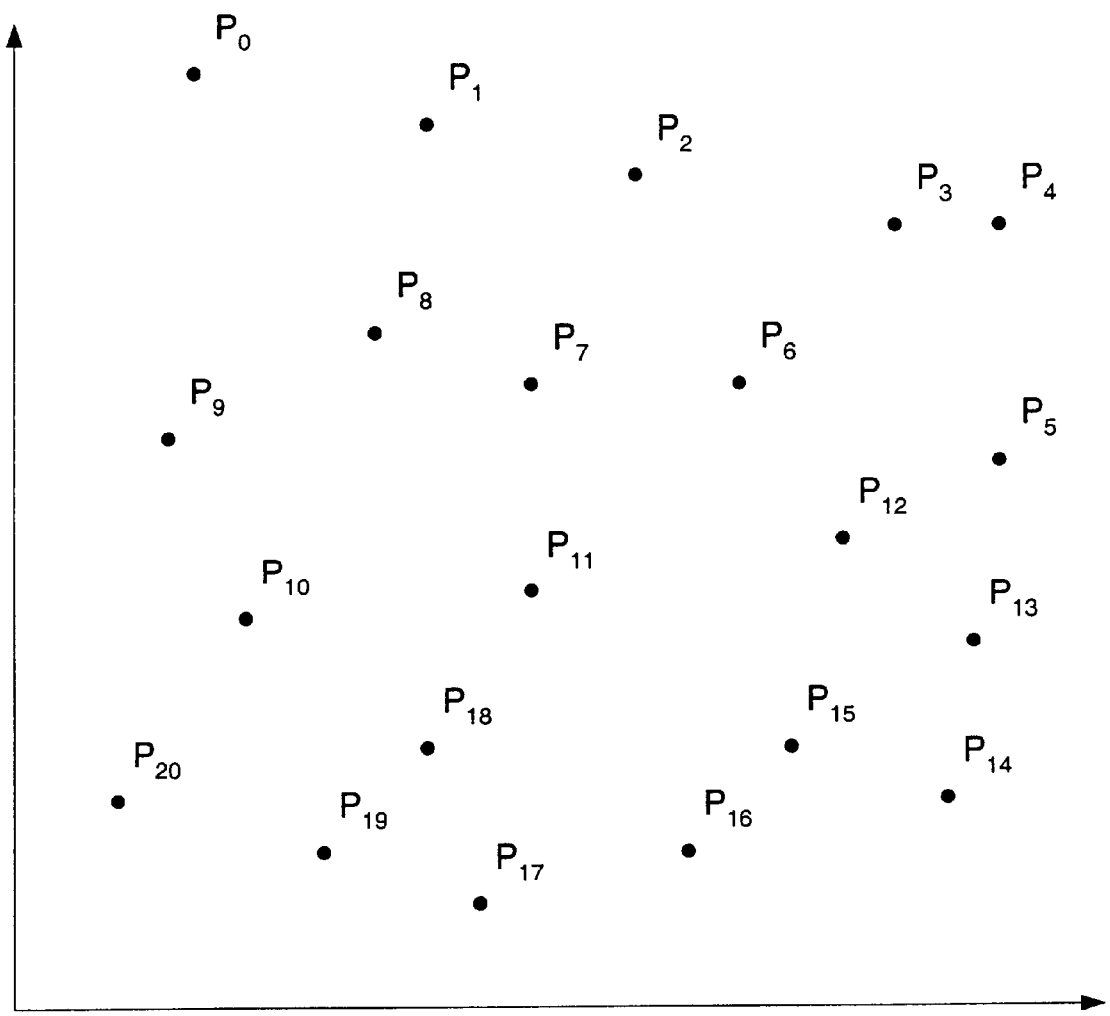
FIG. 2 illustrates a collection X(0) comprises N=21 points distributed in a K=2 dimensional space, wherein the point of collection X(0) are denoted $P_0, P_1, \ldots, P_{N-1}$.

Each vector P(I) in the collection may comprise a sequence of K numbers. Thus, each vector P(I) may represent a point in a K-dimensional space. The number N of vectors in the vector collection may take any value. Similarly, the dimension K may take any value. FIG. 2 illustrates a collection of N=21 points in a two-dimensional space (i.e. K=2).

In one embodiment, receiver 106 may store the input signal data in memory 104 as a vector g with K components. CPU 102 may operate on the input vector g to determine which of the vectors P(0), P(1), P(2), ..., P(N−1) is closest to the input vector. The term "closest vector" may be interpreted with reference to any desired norm (e.g. the Euclidean norm, the $L^1$ norm, the $L^p$ norm where p is a positive real number, the L-infinity norm, etc.), or an approximation to a norm. The collection of vectors P(0), P(1), P(2), ..., P(N−1) may be referred to herein as the collection X(0).

In one alternative embodiment, receiver 106 may store the input signal data in memory 104 in a form that is not directly comparable to the vectors P(0), P(1), P(2), P(N−1). Thus, CPU 102 may be configured to preprocess the input signal data to generate an input vector g with K components. Then, CPU 102 may operate on the input vector g to determine which of the vectors P(0), P(1), P(2), ..., P(N−1) is closest to the input vector g. In another alternative embodiment, a second processing unit may be configured to preprocess the input signal data to generate the input vector g with K components, and to present the input vector g to CPU 102 for determination of the closest vector in the collection of vectors P(0), P(1), P(2), ..., P(N−1).

Signal analysis system 100 may realize any of a variety of devices such as a telecommunication device (e.g. a cell phone, a pager, a modem, a network interface card), a test system or instrument, e.g., a computer-based test system or a dedicated instrument such as a dynamic signal analyzer, or other signal analysis system, etc.

Figure 3A:
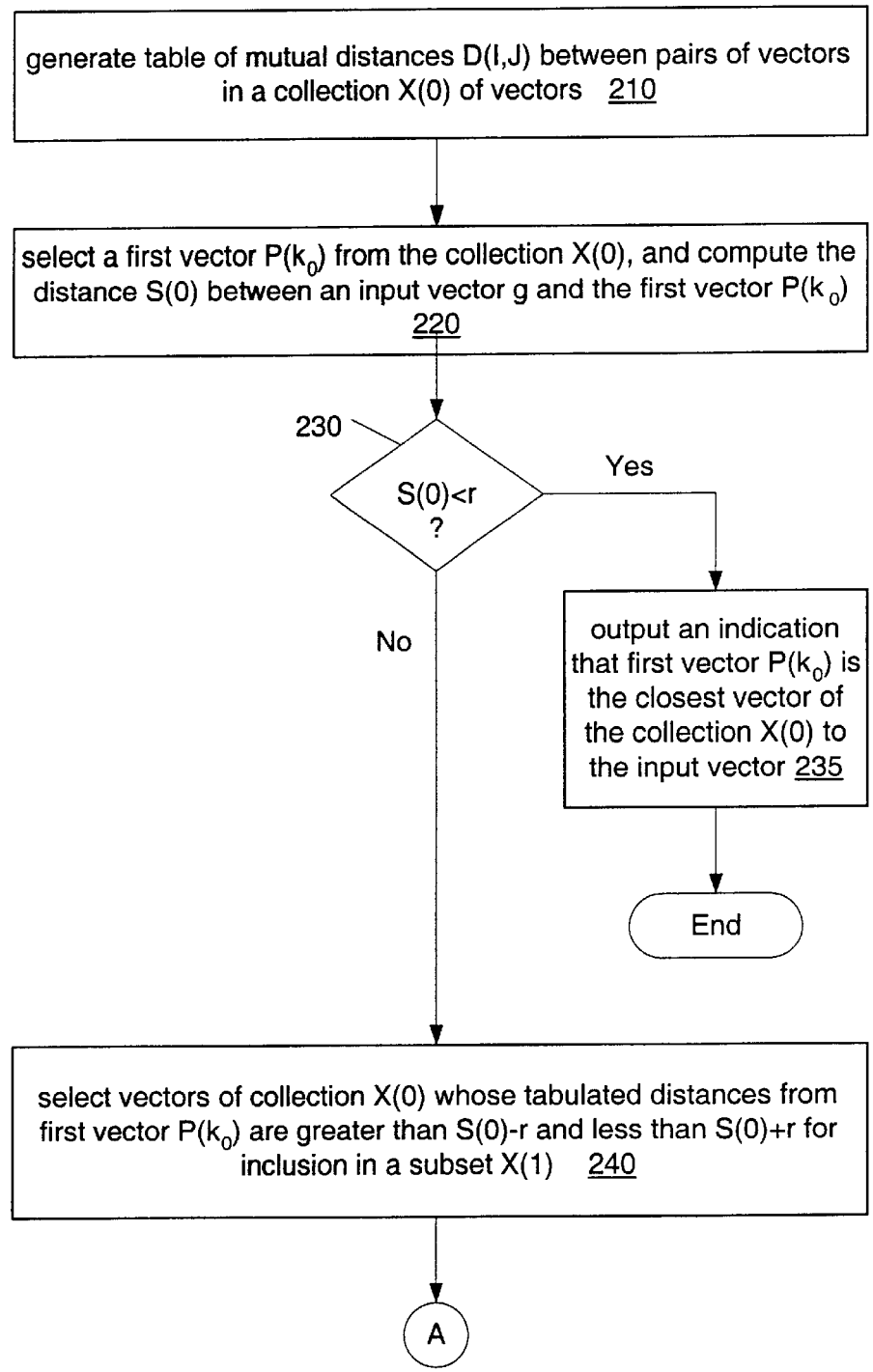
FIGS. 3A and 3B illustrate one embodiment of a signal processing method 200 for identifying a closest vector in a vector collection X(0) to an input vector g.
Figure 3B:
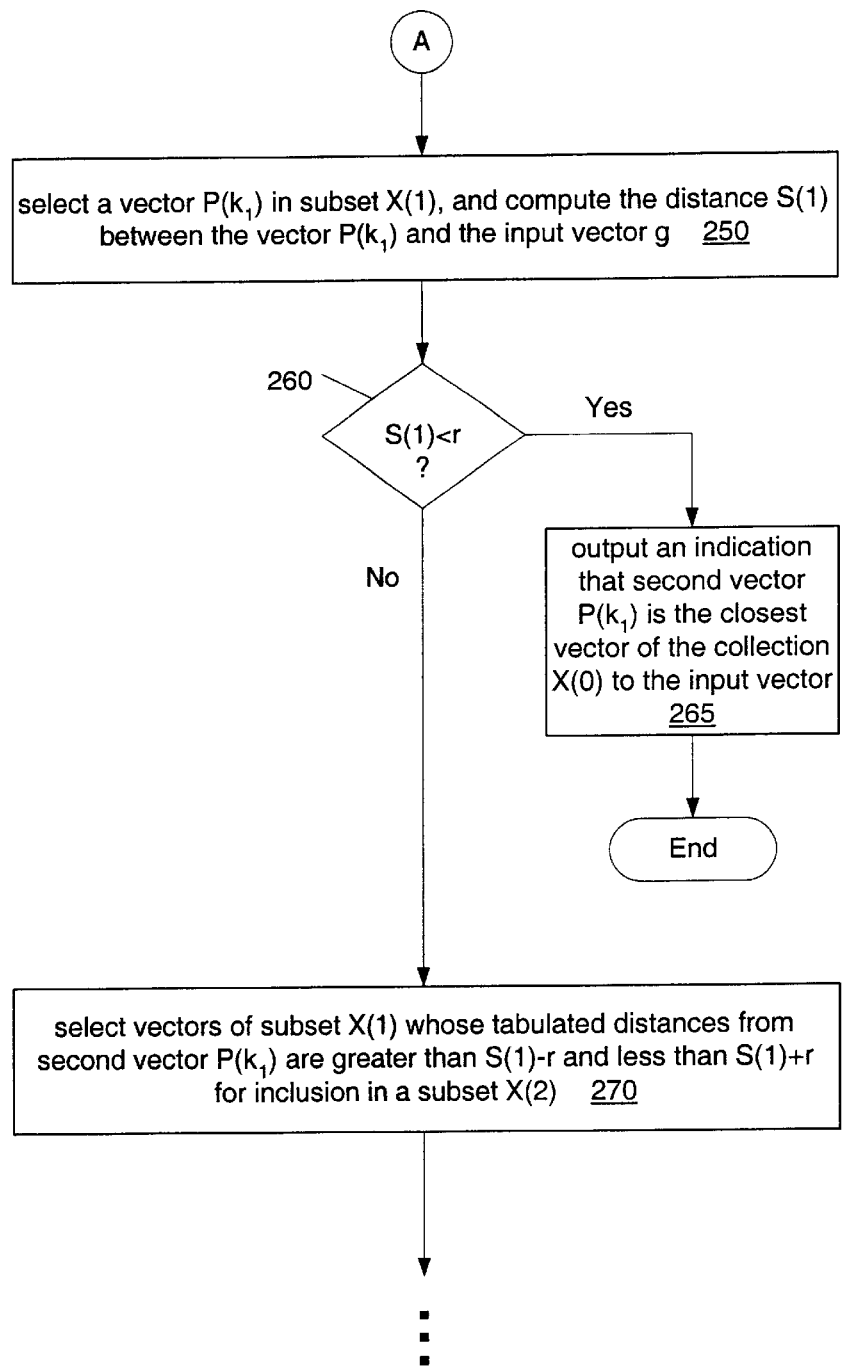

FIGS. 3A and 3B illustrate one embodiment of a signal analysis method 200 according to the present invention. The signal analysis method 200 is preferably implemented by software programs stored in memory 104. In step 210, CPU 102 may operate on the collection X(0) of vectors P(0), P(1), P(2), ..., P(N−1) to generate a table of mutual distances $$D(I,J) = \|P(I) - P(J)\|$$

between each pair of vectors P(I) and P(J) in the collection, where $\|.\|$ denotes a given norm. In other words, for each pair of vectors P(I) and P(J) in the vector collection X(0), CPU 102 may compute the vector difference P(I)−P(J), and may evaluate the length of the vector difference using the given norm. CPU 102 may store the table of mutual distances in memory 104.

As mentioned above, signal analysis system 100 may operate on an input vector g having K components to determine which vector in the collection X(0) of vectors P(0), P(1), P(2), . . . , P(N−1) is closest to the input vector g. The following steps of signal analysis method 200 may operate under the assumption that:

> the input vector g resides within distance r of some (as yet to be determined) vector of the collection X(0).

This assumption is referred to herein as the bounding assumption. Distance r is referred to herein as the bounding radius. Furthermore, the bounding radius r may be less than or equal to ½ of the minimum distance $d_{min}$ between distinct vectors of the collection X(0). The bounding radius r may be provided as an input parameter to signal analysis method 100. Signal analysis system may further comprise a user input device (not shown) through which a user may input/select a value for the bounding radius r. In some embodiments, CPU 102 or some associated processor may estimate the bounding radius r based on physical measurements.

Figure 4:
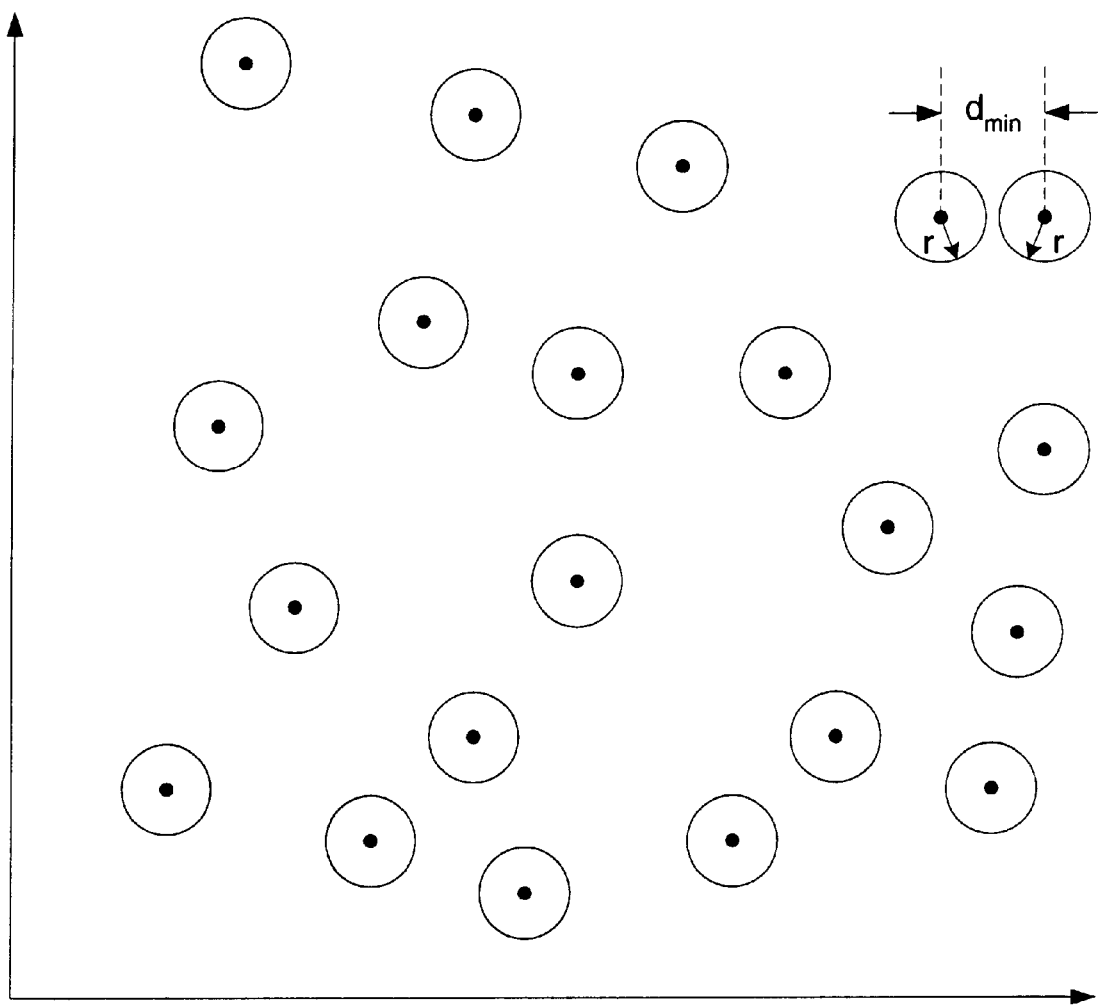
FIG. 4 illustrates the minimum distance $d_{min}$ between vectors of the collection X(0), and also illustrates a collection of disks having radius r smaller than $d_{min}/2$ surrounding the vector of collection X(0)

FIG. 4 illustrates the minimum distance $d_{min}$ for the same collection of vectors X(0) as depicted in FIG. 2. Also, a collection of balls centered on the vectors of the collection X(0) is shown in order to clarify the assumption mentioned above. (In dimension K=2, a ball reduces to a circular disk.) The balls have radii equal to the bounding radius r which is depicted as being somewhat smaller than $d_{min}/2$. The assumption mentioned above is equivalent to the condition that input vector g resides inside one of the solid balls of radius r centered on the points of the collection X(0).

Figure 5:
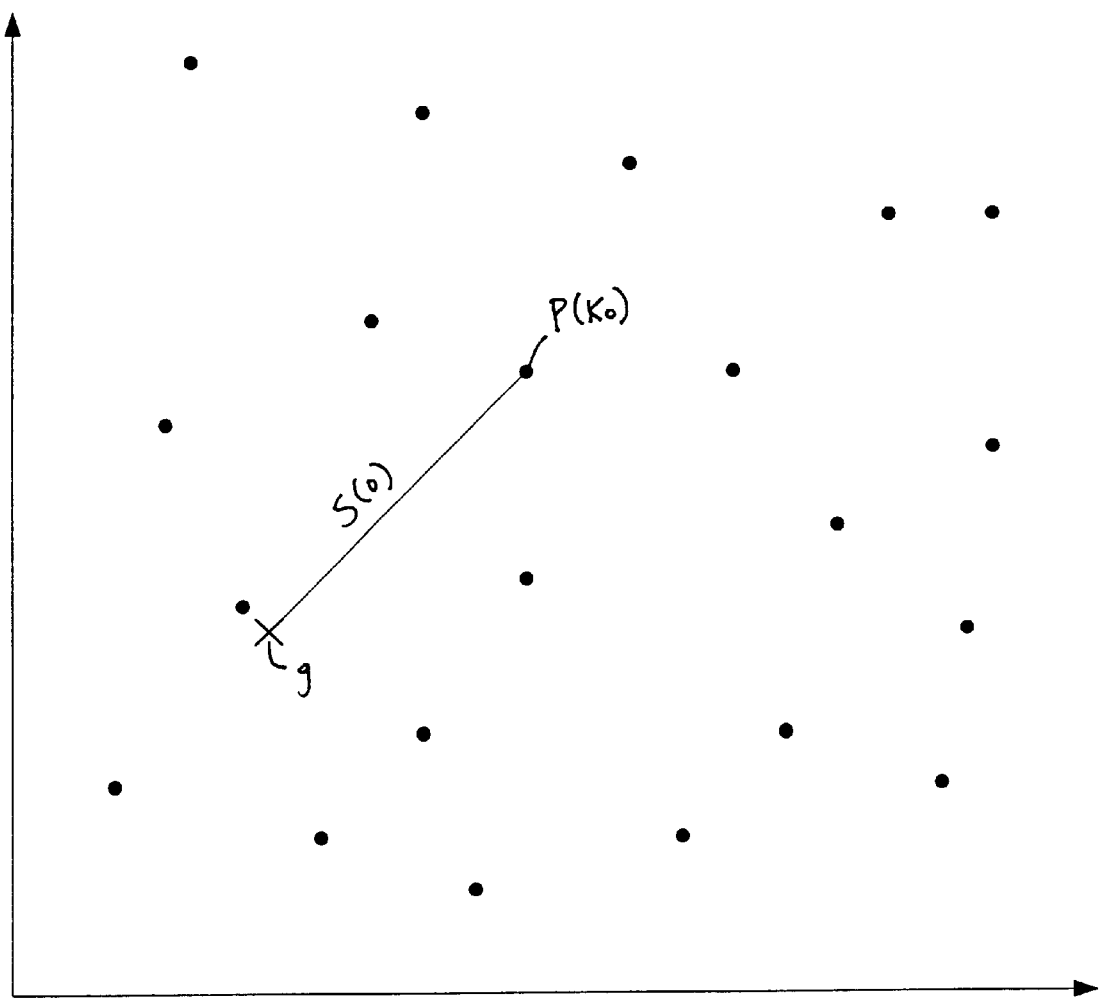
FIG. 5 illustrates the computed distance S(0) between a first selected point $P(k_0)$ and the input vector g.

In step 220, CPU 102 may select a first vector $P(k_0)$ from the collection X(0), and compute the distance $S(0)=\|g-P(k_0)\|$ between the input vector g and the first vector $P(k_0)$ as suggested by FIG. 5. The first vector $P(k_0)$ may be selected arbitrarily. For example, first vector $P(k_0)$ may be the first vector (i.e. first in sequential order) in a list comprising vector collection X(0). As another example, a random or pseudo-random selection scheme may be employed to select first vector $P(k_0)$.

In step 230, CPU 102 may perform a test to determine if the computed distance S(0) is smaller than the bounding radius r. If CPU 102 determines that S(0) is smaller than bounding radius r, then CPU 102 performs step 235. In step 235, CPU 102 provides an output indication that first vector $P(k_0)$ is the closest vector of the collection X(0) to the input vector g. For example, CPU 102 may return the index $k_0$ (or memory address) of the first vector $P(k_0)$, to a calling routine.

The calling routine may be a signal processing algorithm which receives (or computes in response to input signal data) a stream of input vectors $g_0, g_1, g_2, \ldots$, and repeatedly calls signal analysis method 100 in response to each new input vectors $g_j$. In one embodiment, each input vector $g_j$ comprising the input vector stream obeys the bounding assumption with respect to a corresponding bounding radius $r_j$. All of the bounding radii $r_j$ may be smaller than $d_{min}/2$. Thus, the calling routine may provide the input vector $g_j$ and the corresponding bounding radius $r_j$ as input parameters to signal analysis method 200. Recall that $d_{min}$ is the minimum of the distances between distinct points of the vector collection X(0). In another embodiment, the input vectors $g_0, g_1, g_2, \ldots$ comprising the input vector stream may obey the bounding assumption with respect to a common bounding radius r which is smaller then $d_{min}/2$.

Figure 6:
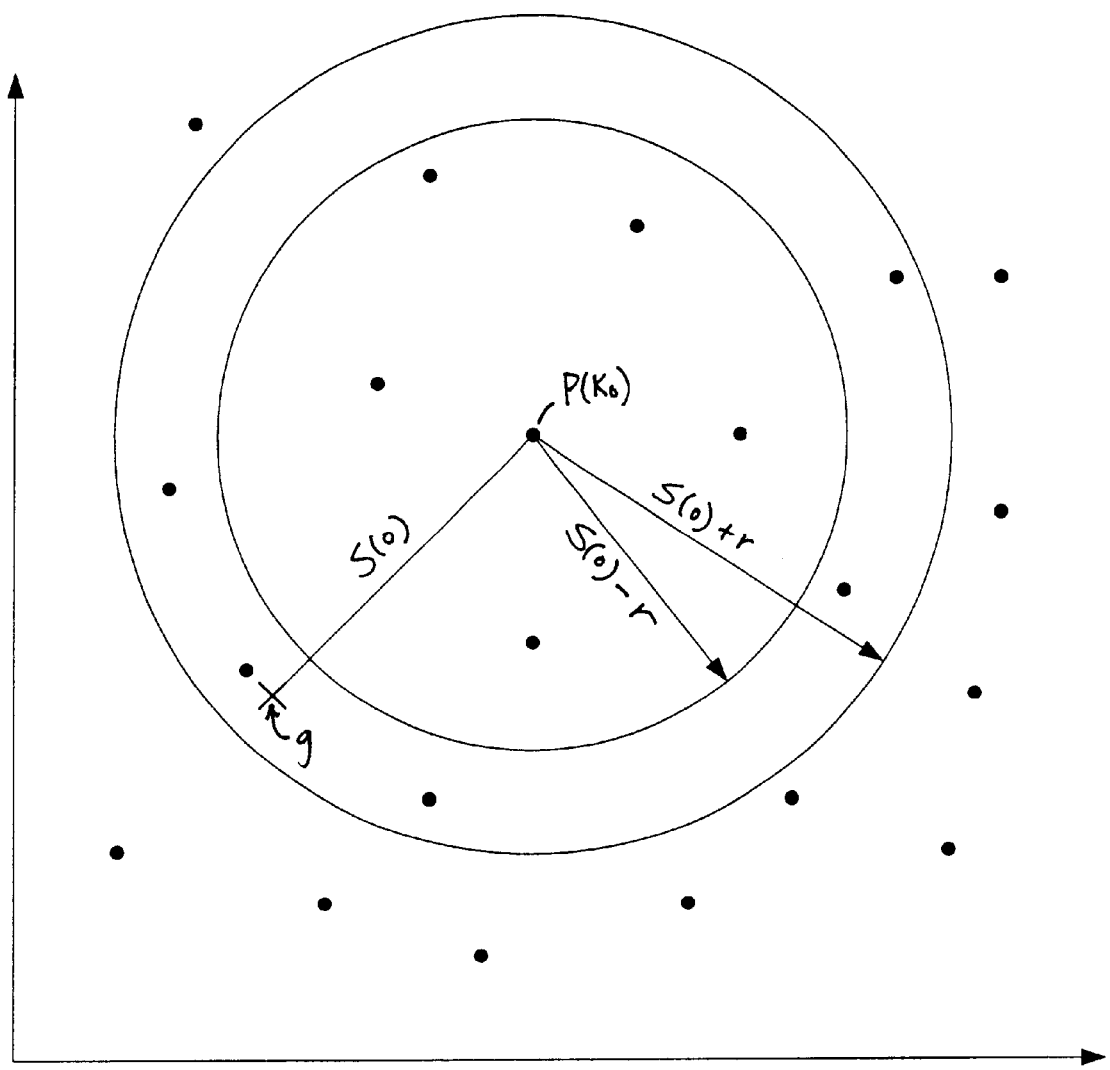
FIG. 6 illustrates a first annular filtration applied to the vector collection X(0) based on an annulus centered on first selected point $P(k_0)$ having inner radius S(0)−r and outer radius S(0)+r, where S(0) is the distance between the first selected point $P(k_0)$ and the input vector g, and r is the bounding radius value.

If CPU 102 determines, in the test of step 230, that computed distance S(0) is not smaller than the bounding radius r, CPU 102 performs step 240. In step 240, CPU 102 performs an annulus filtration on the collection X(0) as illustrated in FIG. 6. In the annulus filtration, CPU 102 examines the pre-computed (in step 210 above) distances $D(k_0, J)$ between first vector $P(k_0)$ and other vectors $P_J$ in collection X(0), and generates a first filtered subset X(1) of original collection X(0). Namely, CPU 102 conditionally assigns vectors of collection X(0) to the first filtered subset X(1) based on their pre-computed distances $D(k_0, J)$ to first vector $P(k_0)$. CPU 102 assigns generic vector P(J) of the collection X(0) as belonging to the first filtered subset X(1) only if the distance $D(k_0, J)$ between vector P(J) and first vector $P(k_0)$ is greater than the value S(0)−r and less than the value S(0)+r. In other words, CPU 102 generates first filtered subset X(1) by selecting the vectors of collection X(0) which reside in the annulus centered on first vector $P(k_0)$ having thickness 2r and average radius S(0). CPU 102 may assign the vector P(J) for inclusion in the first filtered subset X(1) by setting a corresponding bit in an inclusion bit mask. After scanning through the mutual distances $D(k_0, J)$ for all vectors in the vector collection X(0), the one bits in the inclusion bit mask may indicate the vectors which comprise the first filtered subset X(1).

Alternatively, CPU 102 may assign the vector P(J) for inclusion in the first filtered subset X(1) by adding the index value J of vector P(J) to a first sublist of index values. After scanning through the mutual distances $D(k_0, J)$ for all vectors in the vector collection X(0), the first sublist may contain the indices of the vectors comprising first filtered subset X(1). The two mechanisms described above of indicating subset membership, i.e., bit masking and sublist construction, are not meant to be limiting. The present invention contemplates any of a variety of mechanisms for indicating subset membership.

FIG. 6 shows only five vectors which reside in this annulus (i.e. the region between the concentric circles). Thus, these five vectors define the first filtered subset X(1). In general, an "annulus" is the spatial region between two concentric spheres.

The annulus filtration step 240 may be performed quickly because, at least in one embodiment, step 240 comprises only memory accesses to lookup entries in the table of mutual distances, comparison operations to determine whether vectors in or out of a given annulus, and the setting of bits in a bit mask conditioned on the results of the comparison operations. The table of mutual distances and one or more bit masks may be loaded into a data cache in memory 104 for faster access to these data objects. After step 240, CPU 102 performs step 250.

In step 250, CPU 102 selects a vector $P(k_1)$ in first filtered subset X(1), and computes the distance S(1) between the vector $P(k_1)$ and the input vector g. For example, see FIG. 7.

In step 260, CPU 102 performs a test to determine if the computed distance S(1) is smaller than the bounding radius r. If CPU 102 determines that S(1) is smaller than bounding radius r, then CPU 102 performs step 265. In step 265, CPU 102 provides an output indication that vector $P(k_1)$ is the closest vector of the original collection X(0) to the input vector g, and may conclude processing associated with signal analysis method 200. CPU 102 may return the index $k_1$ (or memory address) of the vector $P(k_1)$, to a calling routine.

Figure 7:
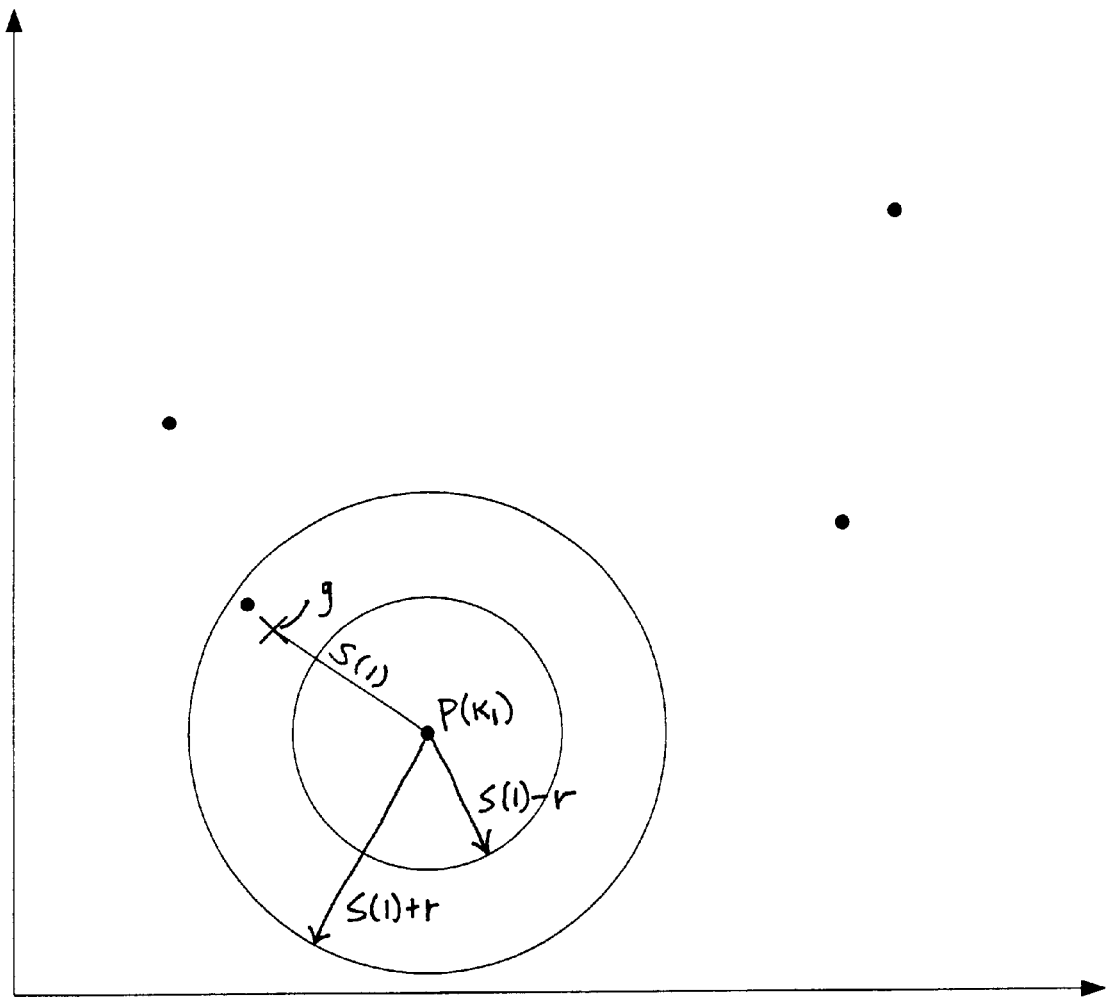
FIG. 7 illustrates a second annulus filtration applied to the first filtered subset X(1), i.e. to those vectors which survived the first annulus filtration, based on an annulus centered on a selected point $P(k_1)$ having inner radius S(1)−r and outer radius S(1)+r, where S(1) is the distance between the second selected point $P(k_1)$ and the input vector g.

If CPU 102 determines, in the test of step 260, that computed distance S(1) is not smaller than the bounding radius r, CPU 102 performs step 270. In step 270, CPU 102 performs an annulus filtration on the first filtered subset X(1)

as illustrated in FIG. 7. In this second annulus filtration, CPU 102 examines the pre-computed (i.e. tabulated) distances $D(k_1,J)$ between vector $P(k_1)$ and other vectors $P(J)$ in first filtration subset $X(1)$, and generates a second filtered subset $X(2)$ of the first filtered subset $X(1)$. Namely, CPU 102 conditionally assigns vectors of the filtered subset $X(1)$ to the second filtered subset $X(2)$ based on their pre-computing distances $D(k_1,J)$ to vector $P(k_1)$. CPU 102 assigns generic vector $P(J)$ of the first filtered subset $X(1)$ as belonging to the second filtered subset $X(2)$ only if the distance $D(k_1,J)$ between vector $P(J)$ and vector $P(k_1)$ is greater than the value $S(1)-r$ and less than the value $S(1)+r$. In other words, CPU 102 generates second filtered subset $X(2)$ by selecting the vectors of first filtered subset $X(1)$ which reside in an annulus centered on vector $P(k_1)$ having thickness $2r$ and average radius $S(1)$.

CPU 102 may assign the vector $P(J)$ for inclusion in the second filtered subset $X(2)$ by setting a corresponding bit in an inclusion bit mask. After scanning through the mutual distances $D(k_1,J)$ for all vectors $P(J)$ of first filtered subset $X(1)$, the one bits in the inclusion bit mask may indicate the vectors which comprise the second filtered subset $X(2)$.

Alternatively, CPU 102 may assign the vector $P(J)$ for inclusion in the second filtered subset $X(2)$ by adding the index value $J$ of vector $P(J)$ to a second sublist of index values. After scanning through the mutual distances $D(k_1,J)$ for all vectors $P(J)$ of the first filtered subset $X(1)$, the second sublist may contain the indices of the vectors comprising second filtered subset $X(2)$.

FIG. 7 illustrates the five vectors (represented as dots) comprising first filtered subset $X(1)$. Only one of these five vectors resides in the new annulus. Thus, second filtered subset $X(2)$ comprises only one vector which is the solution vector.

In the preferred embodiment, steps 220 through 270 described above are subsumed in an iterative search algorithm executed by CPU 102 and illustrated by the following pseudo-code fragment.

| | |
|---|---|
| $m=0$; | (A1) |
| $X(0)$=Original Collection of Vectors; | (A2) |
| Label: Choose vector $P(k_m)$ in subset $X(m)$; | (A3) |
| Compute distance $S(m)=\|P(k_m)-g\|$; | (A4) |
| If $S(m)<r$; Then declare $P(k_m)$ as closest vector and End; | (A5) |
| Else Generate filtered subset $X(m+1)$ of subset $X(m)$; | (A6) |
| $m=m+1$; | (A7) |
| Goto Label; | (A8) |

It is noted that this pseudo-code fragment is not meant to be limiting. Rather a wide variety of coded implementations of system analysis method 200 are contemplated. Steps 220 through 240 of method 200 illustrated in FIG. 3A correspond to a first iteration of steps (A3) through (A6) in the pseudo-code fragment above. Steps 250 through 270 of method 200 illustrated in FIG. 3B correspond to a second iteration of steps (A3) through (A6). The ellipsis in FIG. 3B are intended to suggest that further iterations of the loop comprising steps (A3) through (A6) follow step 270.

The step (A6) which is expressed as "Generate filtered subset $X(m+1)$ of subset $X(m)$" generalizes steps 240 and 270 above. In step (A6), CPU 102 performs an annulus filtration on subset $X(m)$. CPU 102 examines the pre-computed (i.e. tabulated) distances $D(k_m,J)$ between vector $P(k_m)$ and other vectors $P(J)$ in subset $X(m)$, and generates a subset $X(m+1)$ from selected vectors in subset $X(m)$. Namely, CPU 102 conditionally assigns vectors of subset $X(m)$ to the new subset $X(m+1)$ based on their pre-computed distances $D(k_m,J)$ to vector $P(k_m)$. CPU 102 assigns generic vector $P(J)$ of subset $X(m)$ as belonging to the subset $X(m+1)$ only if the distance $D(k_m,J)$ between vector $P(J)$ and vector $P(k_m)$ is greater than the value $S(m)-r$ and less than the value $S(m)+r$. In other words, CPU 102 generates subset $X(m+1)$ by selecting the vectors of subset $X(m)$ which reside in the annulus centered on vector $P(k_m)$ having thickness $2r$ and average radius $S(m)$.

After each-annular filtration of the iterative search, the resulting filtered subset $X(m+1)$ has fewer vectors than its predecessor $X(m)$, sometimes significantly fewer. The area of the annulus used at iteration $m$ equals $4\pi rS(m)$. Thus, the annular filtrations are more effective an eliminating non-solution vectors when bounding radius $r$ is small. Therefore, the system and method embodiments described herein may converge more quickly when the bounding radius is small.

At worst case, the iterative search eliminates only one vector per iteration, and thus, takes N iterations to identify the solution vector (i.e. the closest vector) in the collection $X(0)$ which has N vectors. However, on average, the iterative search may converge to the solution vector in significantly less than N/2 iterations. For example, in a simulation with N=61 vectors randomly distributed in a K=2 dimensional space, the iterative search converged in six iterations.

As described above, signal analysis method 200 operates under the bounding assumption with respect to a bounding radius $r$. In the preferred embodiment, the bounding radius $r$ is provided as an input parameter for signal analysis method 200, e.g., by a calling routine. A user may input the bounding distance $r$ based on user intuition, physical experimentation, analysis of noise models, etc. In one embodiment, signal analysis system 100 employs an adaptive algorithm for estimating bounding distance $r$.

Figure 8:
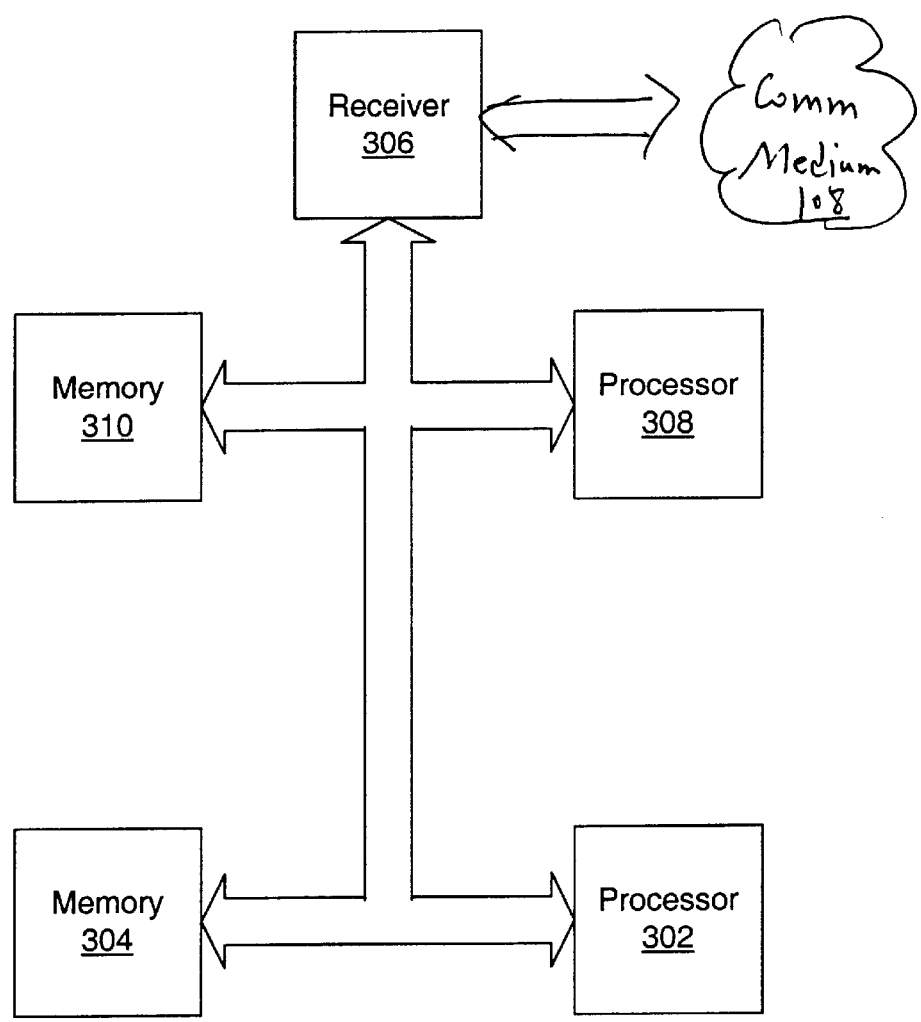
FIG. 8 illustrates one embodiment of a signal analysis system 300 comprising two processors, two corresponding memories, and a receiver.

FIG. 8 illustrates an embodiment of a signal analysis system 300 according to the present invention. Signal analysis system 300 may comprise a first processor 302, a first memory 304, a second processor 308, a second memory 310 and a receiver 306.

Receiver 306 may represent any of a variety of receiving devices and/or sensors. For example, receiver 306 may be a radio receiver, a network interface card, a modem, a sensing device, etc. Receiver 306 may couple to communication medium 108, and may be configured to receive an input signal from communication medium 108. Receiver 306 may be configured to operate on the input signal so as to recover a stream of digital data. For example, receiver 306 may include demodulation and analog-to-digital conversion circuitry for recovering the digital data from the input signal. Receiver 306 may store the digital data into second memory 310. In one embodiment, communication medium 108 may be a digital transmission medium which provides a digital signal to receiver 106. In this case, receiver 106 may not need analog-to-digital conversion circuitry.

First processor 302 may be realized by any of a variety of processor technologies. For example, first processor 302 may be a general-purpose processor. First processor 302 may be configured to execute code and operate on data stored in first memory 304. Second processor 308 may be realized by any of a variety of processor technologies. For example, second processor 308 may be a digital signal processor (DSP).

First processor 302 and second processor 308 may partition the steps of method 200. For example, first processor 302 may perform the initialization step 210 (i.e. computation of mutual distances between vectors of the vector collection X(0)) while running under the control of an initialization routine stored in first memory 304. First processor 302 may transfer (or initiate a transfer of) the table of mutual distances to second memory 310. First processor 302 may also transmit the vector collection X(0) and/or the bounding radius r to second memory 310.

Second processor 308 may execute the iterative search algorithm described by the pseudo-code fragment above. Second memory 310 may also store program code for the iterative search algorithm. Second processor 308 may receive an input vector g from first memory 310, and perform the iterative search algorithm in response to reading and executing the program code.

In one embodiment, first processor 302 may be the CPU of a computer system (e.g. a personal computer), and second processor 308 may be a processor in a peripheral device coupled to the computer system.

In a second embodiment, first processor 302 and second processor 308 may be the CPUs of two computers separated by a network such as a local area network or a wide area network. First processor 302 may transmit the collection of vectors X(0), the table of mutual distances, and the bounding radius r to memory 310 through a reliable transfer protocol such as TCP (i.e. Transmission Control Protocol).

Figure 9:
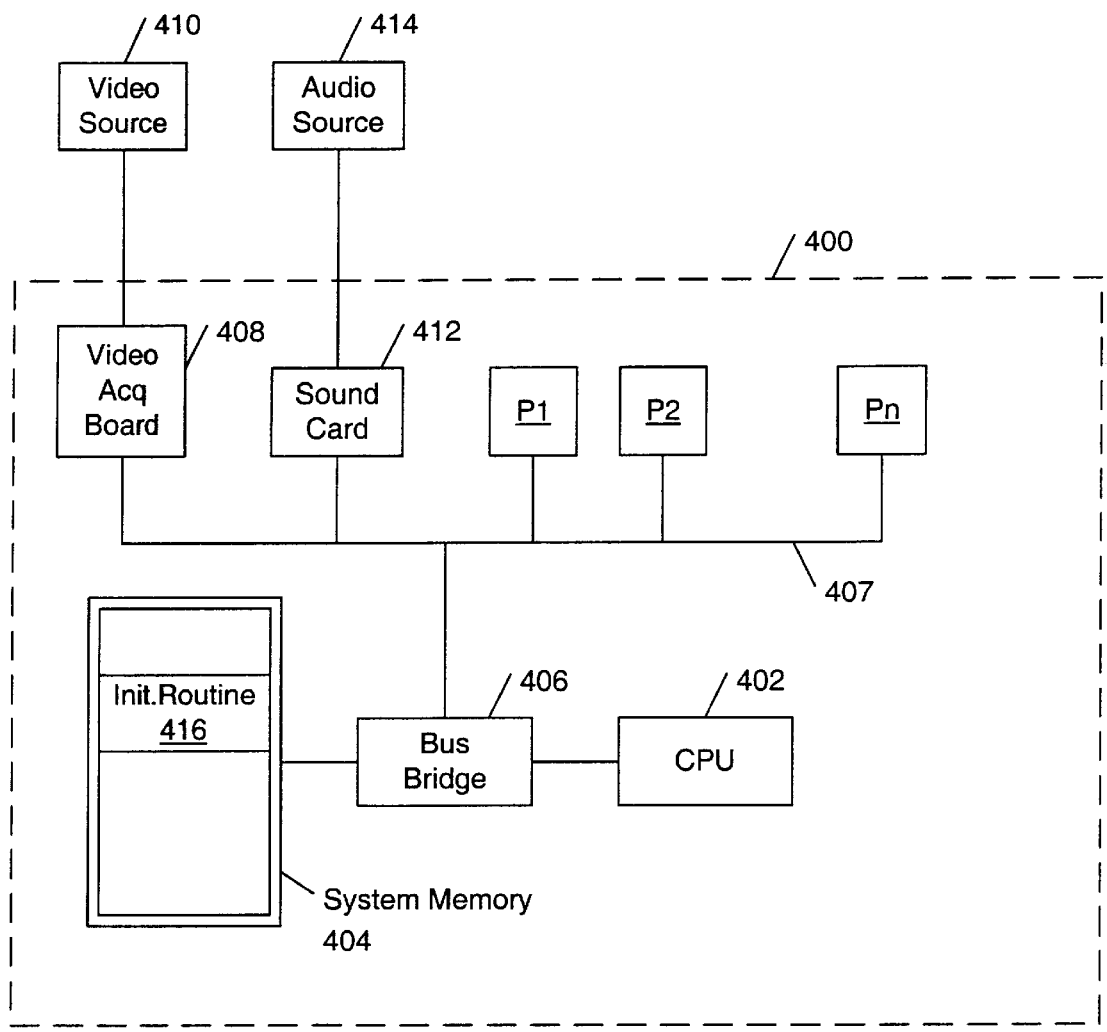
FIG. 9 illustrates one embodiment of a computer system 400 for identifying a closest vector in a vector collection to an input signal vector.

FIG. 9 illustrates one embodiment of a computer system 400 for performing signal analysis according to the present invention. Computer system 400 may include a central processing unit (CPU) 402 and a system memory 404. CPU 402 may be realized by any of a variety of processor technologies. For example, CPU 402 may be a general purpose microprocessor. System memory 404 may store signal analysis routines according to various embodiment of the present invention for execution on CPU 402. Computer system 400 may also include a bus bridge 406 and an array of peripheral devices P1 through Pn coupled to a peripheral bus 407. Bus bridge 406 may mediate data transfers between any two of CPU 402, system memory 404 and peripheral bus 407. Peripheral devices P1 through Pn are representative of devices such as modems, network interface cards, signal acquisition boards, serial interface cards, receivers, etc. Computer system 400 may also include a video acquisition board 408 and/or a sound card 412. Video acquisition board 408 may be configured to acquire image data from a video source 410 (e.g. a video camera, a television receiver, etc.). Video acquisition board 408 may perform DMA or bus-mastering transfers of image data to system memory 404. Sound card 412 may be configured to acquire audio or speech signal data from audio source 414 (e.g. a microphone, a radio receiver, a telephony device, etc.). The sound card 412 may also perform DMA or bus-mastering transfers of audio signal data to system memory 404.

CPU 402 may read the collection X(0) comprising vectors P(0), P(1), P(2), ..., P(N−1) from system memory 404, and may perform the initialization step 210 of method 200 while running under the control of an initialization routine 416 stored in system memory 404. CPU 402 may store the resulting table of mutual distances in system memory 404. CPU 402 may also execute the iterative algorithm described by the pseudo-code fragment above. CPU 402 may receive a stream of vectors $g_1, g_2, g_3, \ldots$ from one of peripherals P1–Pn, video acquisition board 408 or sound card 412, and may perform the iterative algorithm on each vector $g_j$ in the vector stream. Thus, for each vector $g_j$ in the vector stream, CPU 402 may identify which vector in the collection X(0) is closest to the vector g. In some embodiments, CPU 402 may receive input signal data from a peripheral device and preprocess the received input data to generate the stream of vectors $g_1, g_2, g_3, \ldots$.

In one alternative embodiment, CPU 402 may download the collection of vectors P(0), P(1), P(2), ..., P(N−1), the table of mutual distances, and the bounding radius r to an on-board memory (not shown) in one of peripherals P1–Pn, video acquisition board 408 or sound card 412. The peripheral (i.e. the one targeted by the downloaded data) may receive a digital or analog input signal from an external source such as video source 410 or audio source 414, and may extract a stream of vectors $g_1, g_2, g_3, \ldots$ from the input signal. The peripheral may perform the iterative search algorithm on each vector $g_j$ in the vector stream, and thus, may identify a closest vector of the vector collection X(0) for each vector $g_j$. The peripheral may have an embedded CPU and/or dedicated hardware (such as an FPGA) for performing the operations associated with steps (A1) through (A8) of the pseudo-code fragment described above.

The signal analysis system and method embodiments described herein may be employed in a variety of contexts such as in shift estimation (e.g. efficient autocorrelation), pattern/image recognition, code identification, etc.

Efficient Shift Estimation

A great variety of systems may be characterized by the property that they generate a series of signals which are shifted and noise-perturbed versions of some known template signal. For example, radar systems operate by repeatedly transmitting a known pulse template and receiving the pulse reflections generated by objects (such as aircraft) which intercept the field of view of the radar beam. The pulse reflections are delayed versions of the transmitted pulse and are corrupted by various forms of noise such as multipath noise. The time-delay between the transmitted pulse and the pulse reflection is a measure of an object's distance.

Let x(n) represent a known template signal. Let y(n) represent a shifted and noise-perturbed version of template signal x(n). Let $D^m x$ represent the signal which results from shifting template signal x by m units, i.e. $[D^m x](n) = x(n-m)$. One method of estimating the shift between template signal x and signal y may be described in terms of distance minimization as follows:

(B1) generate a collection of shifted template signals $D^m x$, where the shift parameter m ranges over a set E of expected shift values;

(B2) search the collection of shifted template signals for the shifted template signal which is closest to the signal y based on some vector norm.

The shift value $m_{opt}$ of the closest shifted template signal comprises an estimate for the shift between signals x and y. Thus, the vector collection X(0) described herein as one of the inputs to signal analysis method 200 may represent a collection of distinctly shifted versions of a known template signal, and the input vector g described herein as another input to signal analysis method 200 may represent a shifted noise-perturbed version of the template signal. An analysis of the noise environment may provide an estimate for the bounding radius r. Thus, any of the system or method embodiments described above may be used to estimate shift between a known template signal and a shifted noise-perturbed version of the template signal.

The problem of shift estimation is just as relevant for periodic signals, or more generally, for signals defined on the integers modulo L, where L is a positive integer. (Physically realizable discrete-time signals are finite in duration and may be naturally interpreted as being defined on the integers modulo L.) For example, rotational systems may generate signals which are naturally defined on a circle. Thus, the vector collection X(0) may represent a set of cyclically shifted versions of a known template signal f defined on the integers modulo L, and the input vector g may represent a cyclically-shifted noise-perturbed version of the template signal f.

Instead of performing the distance minimization directly on a received signal and shifted versions of a template signal, a signal analysis system or method according to the present invention may project the received signal and shifted templates into a lower dimensional space with a well-chosen transformation (e.g. a matrix multiplication). The distance minimization may be performed on the vector projections instead of the high-dimensional received signal and shifted templates. Thus, the vector collection X(0) described herein may represent a collection of lower-dimensional projections of shifted versions of a known template signal. Similarly, the input vector g described herein may represent the lower-dimensional projection of a received signal. For more information on estimating the shift between two signals based on minimizing distance of lower-dimensional projections, please refer to U.S. patent application Ser. No. 09/435,723 entitled "SYSTEM AND METHOD FOR ESTIMATING A SHIFT BETWEEN TWO SIGNALS WHERE ONE SIGNAL IS KNOWN IN ADVANCE", filed on Nov. 08, 1999, invented by Ram Rajagopal and Lothar Wenzel, and assigned to National Instruments Corporation which is hereby incorporated by reference as through fully and completely set forth herein.

An Image Processing Application

Any of the system and method embodiments described above (e.g. the embodiment described in connection with FIG. 9) may be used to locate a template image embedded with arbitrary displacement and orientation in another image. For more information on a system and method for performing pattern matching to locate rotated and/or scaled instances of a template image in a target image, please see U.S. patent application Ser. No. 09/227,507, titled "Pattern Matching System and Method Which Detects Rotated and Scaled Template Images", filed Jan. 6, 1999, now U.S. Pat. No. 6,222,940, invented by Lothar Wenzel et al., assigned to National Instruments Corporation which is hereby incorporated by reference as through fully and completely set forth herein.

Figure 10A:
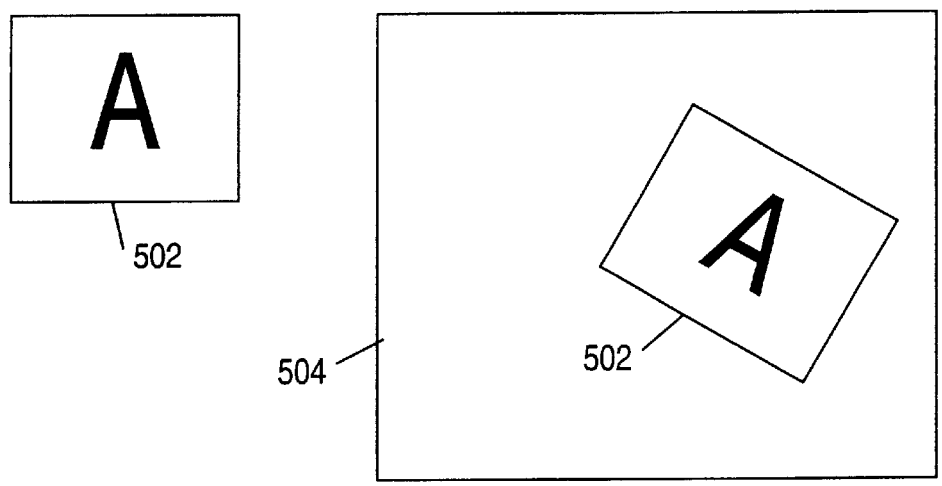
FIG. 10A illustrates a known image.

FIG. 10A illustrates a template image 502 and a second image 504. The template image is embedded in the second image 504. Given the pixel values of the second image 504, any of the signal analysis systems or methods described herein may be used to detect the location and orientation of the template image 502 in the second image 504.

Figure 11:
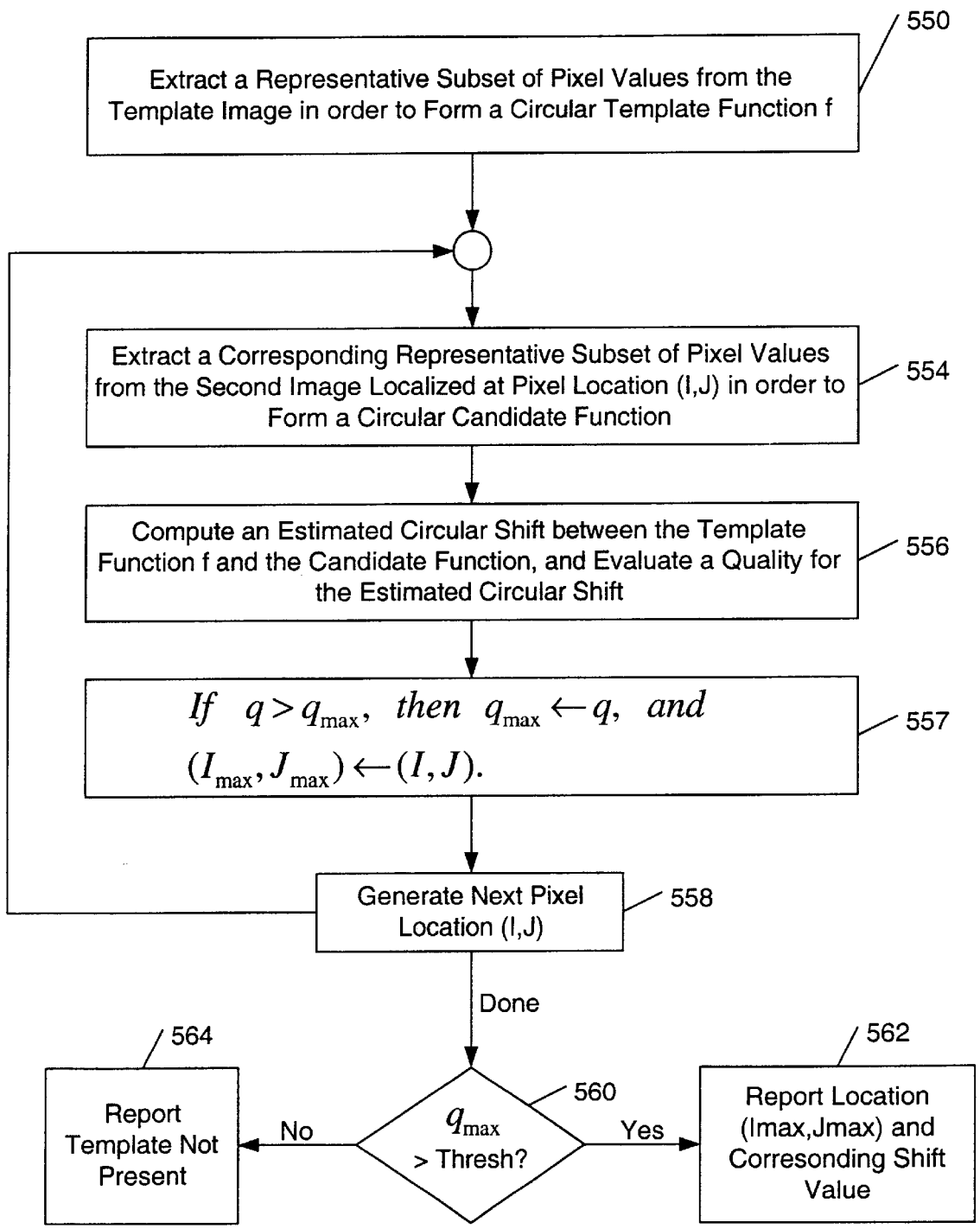
FIG. 11 is a flowchart for one embodiment of a method and system for extracting the location and orientation of an embedded image from an ambient image; and While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

FIG. 11 presents a flowchart for an image detection method according to the present invention. The image detection method may be implemented in software for execution on one or more processors (e.g. CPU 102 of FIG. 1, either or both of processors 302 and 308 of FIG. 8, CPU 402 of FIG. 9, or one or more processors embedded in video acquisition board 408 of FIG. 9). Alternatively, any or all of the steps of the image detection method may be implemented in dedicated hardware such as an FPGA.

Figure 10B:
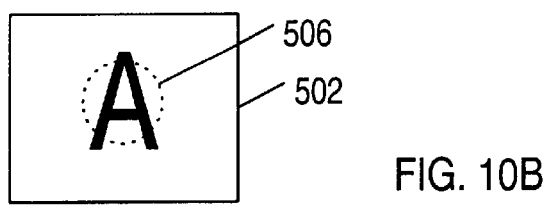
FIG. 10B illustrate the known image embedded in an ambient image.

In step 550, a representative subset 506 of pixel values (as shown in FIG. 10B) is extracted from the template image 502 in order to form a circular template signal f. The representative subset 506 may be a circle. However, other shapes are contemplated for the representative subset 506. The representative subset 506 may be an arbitrary collection of points sampled from template image 502. Circularly shifted (i.e. angularly shifted) versions of the template signal f are generated. In one embodiment, these circularly shifted versions comprise the vector collection X(0). In a second embodiment, the vector collection X(0) comprises a collection of lower-dimensional projections of the circular shifted versions of template signal f.

Figure 10C:
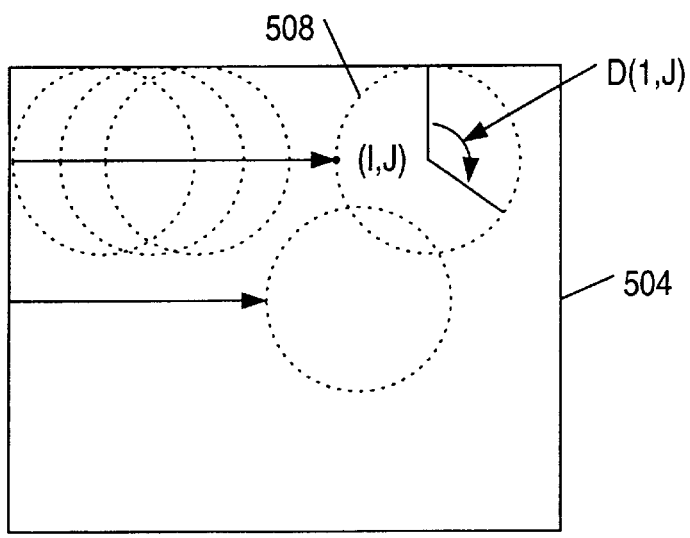
FIG. 10C illustrates a method for detecting the location and orientation of the embedded image in the ambient image.

In step 554, a representative subset 508 of pixel values localized at a pixel location (I,J) is extracted from the second image 504 as suggested by FIG. 10C. The representative subset 508 is preferably chosen so as to match the geometry (i.e. size and shape) of the representative subset 506 extracted from template image 502. A circular candidate signal is formed from the representative subset 508 of pixel values. The candidate signal may be stored as a vector, i.e. a one-dimensional array. The candidate signal may serve as the input vector g to signal analysis method 200 along with the vector collection X(0). Alternatively, the input vector g may be a lower-dimensional projection of the candidate signal.

In step 556, the one or more processors may estimate a circular shift THETA(I,J) between the template signal f and the candidate signal by determining which vector in the collection X(0) is closest to input vector g according to signal analysis method 200. In addition, a quality value q may be computed for the estimated circular shift THETA(I, J). For example, the quality value q may be determined from the distance between input vector g and its closest neighbor in the collection X(0).

In step 557, the quality value q is compared to a maximum quality $q_{max}$. If the quality value q is greater than the maximum quality, the maximum quality $q_{max}$ is assigned the quality value q, and the pixel location $(I_{max}, J_{max})$ of the maximum is updated to the current pixel location (I,J).

In step 558, the next pixel location (I,J) is generated. For example, the horizontal pixel index I may be incremented. When the end of a horizontal row has been reached, the next pixel location (I,J) may be generated by incrementing the vertical pixel index J and setting the horizontal pixel index I to zero. After step 558, processing continues with step 554. Thus, steps 554 through 557 are repeated for a series of pixel locations (I,J). When the last pixel location (Ilast,Jlast) for the second image 504 has been processed, processing continues with step 560.

In step 560, the maximum quality $q_{max}$ is compared to a predetermined threshold value. If the maximum quality $q_{max}$ is greater than the predetermined threshold, step 562 is performed. Otherwise step 564 is performed.

In step 562, the pixel location $(I_{max}, J_{max})$ of the maximum quality, and the shift value $THETA(I_{max}, J_{max})$ of the corresponding candidate signal, are reported as outputs for the image detection method. The pixel location $(I_{max}, J_{max})$ defines the estimated location of the embedded image 502 in the ambient image 504. The shift value $D(I_{max}, J_{max})$ defines the estimated orientation of the embedded image 502 in the ambient image 504.

In step 564, a report is issued indicating that the template image was not detected in the second image 504.

Code Identification Example

In some communication systems, the demodulation of a received signal reduces to identifying which vector in a collection of code vectors in closest to a received symbol in the sense of some vector norm. The received symbol is a noise-perturbed version of one of the code vectors. Each of the code vectors may be associated with a corresponding pattern of data bits. Thus, a communication system may generate a stream of data bits in response to a stream of received symbols by mapping each received symbol to its closest code vector, and concatenating the associated data bit patterns. The vector collection X(0) and input vector g supplied as inputs to the signal analysis method 200 of FIGS. 3A and 3B may represent a collection of code vectors and a received symbol. Thus, any of the signal analysis system and method embodiments described above may be used to perform code identification and demodulation.

The signal analysis system and methods of the described herein may be applied in a variety of contexts including, but not limited to, parameter estimation, pattern recognition, speech recognition, and artificial intelligence (e.g. expert systems, neural networks, etc.).

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A signal analysis system comprising:
   an input configured to receive an input signal from a communication medium;
   a memory coupled to the input, wherein the memory is configured to store a collection of vectors and a table of mutual distances between pairs of vectors of the collection;
   a processing unit coupled to the memory, wherein the processing unit is configured to receive an input vector corresponding to the input signal, wherein the processing unit is further configured to:
   (a) select a vector in the collection of vectors;
   (b) analyze the table of mutual distances to determine a filtered subset of vectors of the collection, wherein the vectors of the filtered subset have a distance to the selected vector greater than a first value and smaller than a second value;
   identify a solution vector from the filtered subset, wherein the solution vector is the closest vector to the input vector in the collection; and
   provide an output indication to a user in response to said identification of the solution vector;
   wherein the processing unit is configured to repeat (a) and (b) zero or more times.

2. The signal analysis system of claim 1, wherein the filtered subset of vectors becomes a new collection of vectors in a subsequent iteration of (a) and (b).

3. The signal analysis system of claim 1,
   wherein, in a repetition of (a), a vector is selected from the filtered subset of vectors, and wherein, in a repetition of (b), a new filtered subset of vectors is determined.

4. The signal analysis system of claim 1,
   wherein the processing unit is configured to repeat (a) and (b) zero or more times until the selected vector has a distance from the input signal which is less than a bounding radius value.

5. The signal analysis system of claim 4, wherein the processing unit is further configured to:
   (c) compute a first distance between the selected vector and the input vector; and
   (d) determine if the first distance is smaller than the bounding radius value;
   wherein the processing unit is configured to perform (c) and (d) after (a) and prior to (b);
   wherein the processing unit is configured to repeat (a), (c), (d), and (b) zero or more times.

6. The signal analysis system of claim 5, wherein, in a first iteration of (b), the processing unit is configured:
   to compute the first value by subtracting the bounding radius value from the first distance; and
   to compute the second value by adding the bounding radius value to the first distance.

7. The signal analysis system of claim 1, wherein, in performing (a) and (b) one or more times, the processing unit is operable to:
   (a1) select a first vector in the collection of vectors,
   (b1) analyze the table of mutual distances to determine a first filtered subset of vectors of the collection, wherein the first filtered subset of vectors have a distance to the first vector greater than the first value and smaller than the second value;
   (a2) select a second vector in the first filtered subset of vectors;
   (b2) analyze the table of mutual distances to determine a second filtered subset of vectors from the first filtered subset of vectors, wherein the second filtered subset of vectors have a distance to the second vector greater than the first value and smaller than the second value.

8. The signal analysis system of claim 1, wherein the memory also stores a minimum distance data determination program;
   wherein the processing unit is configured to perform (a) and (b) and to repeat (a) and (b) zero or more times in response to execution of the minimum distance data determination program.

9. The signal analysis system of claim 1, wherein the processing unit is configured to preprocess the input signal to produce the input vector.

10. The signal analysis system of claim 1, wherein the processing unit is configured to provide the output indication to the user as an audible output indication through a speaker coupled to the processing unit.

11. The signal analysis system of claim 1, wherein the input signal comprises a localized subset of pixel values sampled from a first locality in an pixilated image, wherein the collection of vectors comprise rotated versions of a representative subset of pixel values sampled from a template image, wherein the solution vector indicates the orientation of the template image in the pixilated image.

12. The signal analysis system of claim 1, wherein the input signal comprises a shifted and noise-perturbed version of a known template signal, wherein the collection of vectors comprise shifted versions of the known template signal, wherein the solution vector indicates a shift value between the input signal and the known template signal, wherein the output indication indicates the shift value to the user.

13. The signal analysis system of claim 1, wherein the collection of vectors comprises a set of codes, wherein each of the codes corresponds to an associated bit pattern, wherein the input signal comprises a noise-perturbed version of one of the codes, wherein the solution vector comprises an estimate of said one of the codes.

14. The signal analysis system of claim 1 further comprising an additional processor, wherein the additional processor is configured to compute the table of mutual distances and to transmit the table to the memory.

15. A signal analysis system comprising:
- a receiver configured to receive a first signal from a communication medium;
- a memory configured to store a first collection of vectors, and a table of mutual distances between pairs of vectors of the first collection;
- a first processing unit configured to receive an input vector in response to said receiver receiving the first signal, wherein the first processing unit is further configured to:
  - (a) select a first vector in the first collection of vectors;
  - (b) analyze the table of mutual distances to determine a first filtered subset of vectors of the first collection, wherein the first filtered subset of vectors have a distance to the first vector greater than a first value and smaller than a second value;
  - (c) identify a solution vector, which is the closest vector to the input vector in the first collection, from the first filtered subset; and
  - (d) provide a first output indication to a user in response to said identification of the solution vector.

16. The signal analysis system of claim 15, wherein the first processing unit is further configured to:
- (e) compute a first distance between the input vector and the first vector; and
- (f) determine if the first distance is smaller than a bounding radius value;
- wherein the first processing unit is configured to perform (b) and (c) in response to the first distance not being smaller than the bounding radius value.

17. The signal analysis system of claim 16, wherein the first processing unit is configured to compute the first value by subtracting the bounding radius value from the first distance, and to compute the second value by adding the bounding radius value to the first distance.

18. The signal analysis system of claim 16, wherein the first processing unit is configured to identify the first vector as the solution vector and to provide a second output indication to the user if the first distance is smaller than the bounding radius value.

19. The signal analysis system of claim 15, wherein the first processing unit is configured to perform (c) by:
- (c1) selecting a second vector in the first filtered subset of vectors,
- (c2) computing a second distance between the second vector and the input vector,
- (c3) determining if the second distance is smaller than the bounding radius value;
- (c4) analyzing the table of mutual distances to determine a second filtered subset of vectors from the first filtered subset, wherein the second filtered subset of vectors have a distance to the second vector greater than a third value and smaller than a fourth value;
- (c5) identifying the solution vector from the second filtered subset;
- wherein the first processor is configured to perform (c4) and (c5) if the second distance is not smaller than the bounding radius value.

20. The signal analysis system of claim 19, wherein the first processing unit is further configured to identify the second vector as the solution vector and to provide a third output indication to the user if the second distance is smaller than the bounding radius value.

21. The signal analysis system of claim 19, wherein first processing unit is further configured to compute the third value by subtracting the bounding radius value from the second distance, and to compute the fourth value by adding the bounding radius value to the second distance.

22. The signal analysis system of claim 15 further comprising a second processing unit configured to compute the table of mutual distances and to store the table in the memory.

23. A method for determining a closest signal from a plurality of stored signals to an input signal, wherein the input signal comprises a sequence of samples, wherein the plurality of stored signals are stored in a memory as a collection of vectors, wherein the memory also stores a table of mutual distances between pairs of vectors of the collection, the method comprising:
- (a) receiving the input signal from a communication medium;
- (b) selecting a vector in the collection of vectors,
- (c) analyzing the table of mutual distances to determine a filtered subset of vectors of the collection, wherein the filtered subset of vectors have a distance to the selected vector greater than a first value and smaller than a second value;
- repeating (b) and (c) zero or more times;
- (d) determining a solution vector from the filtered subset, wherein the solution vector is the closest vector to the input signal in the collection; and
- (e) providing an output indication to a user in response to said determination of the solution vector.

24. The method of claim 23, wherein the filtered subset of vectors becomes a new collection of vectors in a subsequent iteration of (b) and (c).

25. The method of claim 23, wherein, in a repetition of (b), a vector is selected from the filtered subset of vectors, and wherein, in a repetition of (c), a new filtered subset of vectors is determined.

26. The method of claim 23, wherein (b) and (c) are repeated zero or more times until the selected vector has a distance from the input signal less than a bounding radius value.

27. The method of claim 26 further comprising:
- (f) computing a first distance between the selected vector and the input signal; and
- (g) determining if the first distance is smaller than the bounding radius value;
- wherein (f) and (g) are performed after (b) and prior to (c);
- wherein said repeating (b) and (c) zero or more times comprises repeating (b), (f), (g), and (c) zero or more times.

28. The method of claim 26, wherein a first iteration of (c) further comprises:
- computing the first value by subtracting the bounding radius value from the first distance; and
- computing the second value by adding the bounding radius value to the first distance.

29. The method of claim 23, wherein, (b) and (c) and said repeating (b) and (c) zero or more times comprises:
- (b1) selecting a first vector in the collection of vectors,
- (c1) analyzing the table of mutual distances to determine a first filtered subset of vectors of the collection, wherein the first filtered subset of vectors have a distance to the first vector greater than the first value and smaller than the second value;
- (b2) selecting a second vector in the first filtered subset of vectors;

(c2) analyzing the table of mutual distances to determine a second filtered subset of vectors from the first filtered subset of vectors, wherein the second filtered subset of vectors have a distance to the second vector greater than the first value and smaller than the second value.

30. The method of claim 23, wherein said providing the output indication to the user comprises providing an audible output indication through a speaker.

31. The method of claim 23, wherein said providing the output indication to the user comprises providing a visual output indication through a display device.

32. The method of claim 23, wherein the input signal comprises a local subset of pixel values sampled from a first locality in an pixilated image, wherein the collection of vectors comprise rotated versions of a representative subset of pixel values sampled from a template image, wherein the solution vector indicates the orientation of the template image in the pixilated image.

33. The method of claim 23, wherein the input signal comprises a shifted and noise-perturbed version of a known template signal, wherein the collection of vectors comprise shifted versions of the known template signal, wherein the solution vector indicates a shift value between the input signal and the known template signal.

34. The method of claim 23, wherein the collection of vectors comprises a set of codes, wherein each of the codes corresponds to an associated bit pattern, wherein the input signal comprises a noise-perturbed version of one of the codes, wherein the solution vector comprises an estimate of said one of the codes.

35. A method for determining a closest signal from a plurality of stored signals to an input signal, wherein the input signal comprises a sequence of samples, wherein the plurality of stored signals are stored in a memory as a collection of vectors, wherein the memory also stores a table of mutual distances between pairs of vectors of the collection, the method comprising:
(a) receiving the input signal from a communication medium;
(b) selecting a first vector in the first collection of vectors;
(c) analyzing the table of mutual distances to determine a first filtered subset of vectors of the first collection, wherein the first filtered subset of vectors have a distance to the first vector greater than a first value and smaller than a second value;
(d) identifying a solution vector, which is the closest vector to the input signal in the first collection, from the first filtered subset; and
(e) providing a first output indication to a user in response to said identification of the solution vector.

36. The method of claim 35 further comprising:
(e) computing a first distance between the input vector and the first vector; and
(f) determining if the first distance is smaller than a bounding radius value;
wherein (b) and (c) are performed in response to the first distance not being smaller than the bounding radius value.

37. The method of claim 36, wherein (c) comprises:
computing the first value by subtracting the bounding radius value from the first distance, and
computing the second value by adding the bounding radius value to the first distance.

38. The method of claim 36, further comprising:
identifying the first vector as the solution vector, and
providing a second output indication to the user, if the first distance is smaller than the bounding radius value.

39. The method of claim 35, wherein (c) comprises:
(c1) selecting a second vector in the first filtered subset of vectors,
(c2) computing a second distance between the second vector and the input vector,
(c3) determining if the second distance is smaller than the bounding radius value;
(c4) analyzing the table of mutual distances to determine a second filtered subset of vectors from the first filtered subset, wherein the second filtered subset of vectors have a distance to the second vector greater than a third value and smaller than a fourth value;
(c5) identifying the solution vector from the second filtered subset.
performing (c4) and (c5) if the second distance is not smaller than the bounding radius value.

40. The method of claim 39, further comprising:
identifying the second vector as the solution vector, and
providing a third output indication to the user, if the second distance is smaller than the bounding radius value.

41. The method of claim 39, wherein (c4) comprises:
computing the third value by subtracting the bounding radius value from the second distance, and
computing the fourth value by adding the bounding radius value to the second distance.

* * * * *